(12) United States Patent
Bausch et al.

(10) Patent No.: US 8,840,430 B2
(45) Date of Patent: Sep. 23, 2014

(54) ELECTRICAL CONNECTOR

(75) Inventors: Michael E. Bausch, Livonia, NY (US); Jose R. Duran, Williamson, NY (US); Jason Scott, W. Henrietta, NY (US)

(73) Assignee: Harris Corporation, Melbourne, FL (US)

( * ) Notice: Subject to any disclaimer, the term of this patent is extended or adjusted under 35 U.S.C. 154(b) by 168 days.

(21) Appl. No.: 13/562,727

(22) Filed: Jul. 31, 2012

(65) Prior Publication Data

US 2014/0038458 A1 Feb. 6, 2014

(51) Int. Cl.
*H01R 13/22* (2006.01)
*H02J 7/00* (2006.01)

(52) U.S. Cl.
CPC .............. *H01R 13/22* (2013.01); *H02J 7/0045* (2013.01); *Y10S 439/929* (2013.01)
USPC .......................................... 439/587; 439/929

(58) Field of Classification Search
CPC ...... H02J 7/0045; G06F 1/1632; Y02E 60/12; D06F 79/026; H01M 2/1022
USPC .......................................... 439/929, 271, 862
See application file for complete search history.

(56) References Cited

U.S. PATENT DOCUMENTS

| | | | | |
|---|---|---|---|---|
| 4,274,197 A * | 6/1981 | Bethurum | ........................ | 29/861 |
| 4,738,628 A * | 4/1988 | Rees | ................................ | 439/95 |
| 4,995,389 A * | 2/1991 | Harris | ............................... | 607/37 |
| 5,052,943 A * | 10/1991 | Davis | ............................. | 439/357 |
| 5,127,849 A | 7/1992 | Karl et al. | | |
| 5,197,895 A * | 3/1993 | Stupecky | ...................... | 439/194 |
| 5,336,246 A * | 8/1994 | Dantanarayana | ................ | 607/37 |
| 5,702,266 A * | 12/1997 | Jones | ............................. | 439/357 |
| 5,993,240 A * | 11/1999 | Schaefer | ........................ | 439/359 |
| 7,048,555 B2 | 5/2006 | Ono | | |
| 7,320,607 B2 | 1/2008 | Kim et al. | | |
| 7,598,924 B2 * | 10/2009 | Hynes et al. | ................... | 343/906 |
| 7,630,768 B1 * | 12/2009 | Coffed et al. | .................... | 607/37 |
| 7,725,190 B2 * | 5/2010 | Iyer et al. | ......................... | 607/36 |
| 7,744,381 B2 * | 6/2010 | Honda | ............................. | 439/79 |
| 7,955,095 B1 | 6/2011 | Yang | | |
| 8,016,610 B1 | 9/2011 | Lee et al. | | |
| 8,103,348 B1 * | 1/2012 | Coffed et al. | .................... | 607/37 |
| 8,107,251 B2 * | 1/2012 | Yamauchi | ...................... | 361/752 |
| 8,108,045 B2 * | 1/2012 | Biggs et al. | ...................... | 607/37 |
| 8,123,567 B2 * | 2/2012 | Kast et al. | ...................... | 439/668 |
| 8,139,364 B2 * | 3/2012 | Wickett | ......................... | 361/752 |
| 8,206,180 B1 * | 6/2012 | Kast et al. | ...................... | 439/668 |
| 8,412,330 B2 * | 4/2013 | Kast et al. | ........................ | 607/37 |

(Continued)

*Primary Examiner* — Amy Cohen Johnson
*Assistant Examiner* — Vladimir Imas
(74) *Attorney, Agent, or Firm* — Fox Rothschild LLP; Robert J. Sacco, Esq.

(57) ABSTRACT

Systems and methods (900) for providing an electrical connector (101, 700) in an electronic device (100). The electrical connector comprises a connector body (350) comprising a planar layer of insulator material having a first face (470) opposed from a second face (370), and a peripheral wall extending around a periphery of the connector body. The electrical connector further comprises one or more conductive posts (401, 403, 405, 407), each having an electrical contact at a first end, and a spring anchor (311, 313, 315, 317) at an opposing end. The connector body comprises one or more elongated cavity structures, each comprising a recess (613) molded into the second face. Conductive spring members (301, 303, 305, 307), each comprised of an elongated cantilevered beam element, are secured by one of the spring anchors within one of the cavity structures. An outer seal (360) is provided, coextensive with the peripheral wall.

26 Claims, 10 Drawing Sheets

(56) References Cited

U.S. PATENT DOCUMENTS

| | | | | |
|---|---|---|---|---|
| 8,548,397 | B1* | 10/2013 | Bausch et al. | 455/90.3 |
| 8,552,311 | B2* | 10/2013 | Koester et al. | 174/262 |
| 8,593,816 | B2* | 11/2013 | Iyer et al. | 361/728 |
| 8,612,012 | B2* | 12/2013 | Leigh et al. | 607/57 |
| 2003/0183698 | A1* | 10/2003 | Wu | 235/492 |
| 2003/0216067 | A1 | 11/2003 | Yeh | |
| 2008/0197199 | A1 | 8/2008 | Terlizzi et al. | |
| 2009/0221331 | A1 | 9/2009 | Crawford et al. | |
| 2010/0240253 | A1* | 9/2010 | Kast et al. | 439/589 |
| 2010/0330935 | A1 | 12/2010 | Maggert et al. | |

* cited by examiner

ELECTRICAL CONNECTOR

STATEMENT OF THE TECHNICAL FIELD

The invention concerns sealed electronic devices. More particularly, the invention concerns electrical connectors for use in sealed electronic devices.

DESCRIPTION OF THE RELATED ART

Electronic devices typically include a housing that defines an internal volume. The internal volume typically includes internal components such as, for example, Printed Circuit Boards (PCBs), resistors, capacitors, processors, memory, and other components.

A sealed housing can be provided in electronic devices. For example, a portable communication device, such as a Land Mobile Radio (LMR) unit, can include a water-tight housing to facilitate use of the LMR unit in rain or other wet conditions. Sealed electronic devices can also be designed for protection against other substances, including fluids, gases and/or liquids.

Electronic devices can also include removable components configured to releasably attach to a housing of the electronic device. The electronic device can include an electrical connector configured to facilitate an electrical connection between a removable component and an internal component. For example, an electrical connector can be electrically and/or mechanically attached to a printed circuit board internal to the device, and accessible through an aperture in the device housing. Removable components often include electrical contacts for forming an electrical connection with one or more electronic contacts on an electrical connector. For example, a removable battery pack can provide electrical power to internal components of an LMR unit when attached, via an electrical connector in the LMR unit.

SUMMARY OF THE INVENTION

Embodiments of the present invention concern electrical connectors. Each electrical connector comprises a connector body including a planar layer of insulator material. The connector body has a first face opposed from a second face, and a peripheral wall extending around a periphery of the connector body from the first face to the second face. The electrical connector further comprises one or more conductive posts traversing the planar layer from the first face to the second face. Each of the conductive posts includes an electrical contact element at a first end of the conductive post disposed at the first face, and a spring anchor at an opposing end of the post disposed at the second face. The connector body comprises one or more elongated cavity structures, each comprising a recess molded into the second face. The electrical connector further comprises one or more conductive spring members, each comprised of an elongated cantilevered beam element secured at an end thereof by the spring anchor within a respective one of the cavity structures. The electrical connector further comprises an outer seal coextensive with the peripheral wall.

Embodiments of the present invention further concern sealed electronic devices. Each sealed electronic device comprises a printed wiring board. An electrical connector is secured to the printed wiring board. The electrical connector comprises a connector body that includes a planar layer of insulator material having a first face opposed from a second face, and a peripheral wall extending around a periphery of the connector body from the first face to the second face. The electrical connector further comprises one or more conductive posts traversing the planar layer from the first face to the second face. Each conductive post includes an electrical contact element at a first end of the conductive post disposed at the first face, and a spring anchor at an opposing end of the post disposed at the second face. The connector body comprises one or more elongated cavity structures, each comprising a recess molded into the second face. The electrical connector further comprises one or more conductive spring members, each comprised of an elongated cantilevered beam element secured at an end thereof by one of the spring anchors within a respective one of the cavity structures. The electrical connector further comprises an outer seal coextensive with the peripheral wall.

Embodiments of the present invention further concern methods for providing a sealed connector on an electronic device. The methods generally involve providing an electrical connector which includes a connector body formed of a planar layer of insulator material having a first face opposed from a second face, and a peripheral wall extending around a periphery of the connector body from the first face to the second face. The electrical connector further includes one or more conductive posts traversing the planar layer from the first face to the second face, and including a surface mount technology (SMT) electrical contact element at a first end of the conductive post disposed at the first face. The connector body includes one or more elongated cavity structures, each formed as a recess molded into the second face. The electrical connector further includes one or more conductive spring members electrically connected respectively to the conductive posts, each spring member comprised of an elongated cantilevered beam element secured at an end thereof by a spring anchor within a respective one of the cavity structures. The electrical connector further includes an outer seal coextensive with the peripheral wall. The methods further involve disposing the electrical connector on a printed wiring board (PWB) to form at least one electrical connection with one of the SMT electrical contacts. The printed wiring board is enclosed within a housing including an aperture formed from at least one housing wall. The outer seal is aligned with the aperture and the outer seal is compressed against the housing wall.

BRIEF DESCRIPTION OF THE DRAWINGS

Exemplary embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate exemplary embodiments of the present invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention will now be described with respect to FIGS. 1-9. Embodiments of the present invention generally relate to sealed electronic devices designed for use with one or more removable components. Such electronic devices can include, but are not limited to, radios, mobile telephones, cellular telephones, video cameras, recording devices, digital cameras, sensors, garage door openers, smoke alarms and other electronic devices. The removable components can include, but are not limited to, removable batteries, removable antennae, and other removable electronic components. Conventional electronic devices may comprise a sealed housing having an environmental seal. However, in conventional electronic devices it is necessary that a removable component is attached in order to form a seal. In other words, conventional electronic devices are not environmentally sealed when a removable component is removed.

According to embodiments of the invention, an electrical connector is provided in an electronic device. Removable components can be electrically coupled to the electronic device via the electrical connector. The electrical connector is configured to provide a water-tight seal between a housing of the electronic device and the electrical connector, and provides a seal even when a removable component is not attached. The electrical connector can be configured to meet standard MIL-STD-810G requirements. The electrical connector is water-tight, but is also configured to resist intrusion by other substances, including, but not limited to, fluids, liquids, gases, liquid water, water vapor, ice, wind-blown rain and freezing rain, humidity, sand, and dust. The electrical connector is further designed to maintain the seal and to maintain electrical contact between a removable component and the electronic device, even in conditions including shock and/or vibration, including, but not limited to, transport shock (i.e., triangle/sine/square wave shocks), gunfire vibration, and random vibration.

According to embodiments of the invention, an electrical connector is designed for use as a component in a wide variety of different electronic devices. The electrical connector is designed to be mounted on a board such as a Printed Wiring Board (PWB) or Printed Circuit Board (PCB) in an electronic device having a housing, and to be accessible through an aperture in the device housing. The electrical connector is further configured to accommodate relatively large variations in spacing between the PCB and the housing, making it useful in a wide variety of electronic devices. The electrical connector can be manufactured and installed in large volumes using manufacturing and installation techniques described herein.

Before describing the electrical connectors of the present invention, it will be helpful in understanding an exemplary environment in which the invention can be utilized. In this regard, it should be understood that the electrical connectors of the present invention can be utilized in a variety of different applications where removable components are used in conjunction with an electronic device. Such applications include, but are not limited to, radio applications, mobile/cellular telephone applications, visual/audio recording applications, camera applications, sensor applications, garage door opener applications, smoke alarm applications, television controller applications, and other military/commercial electronic device applications.

Figure 1:
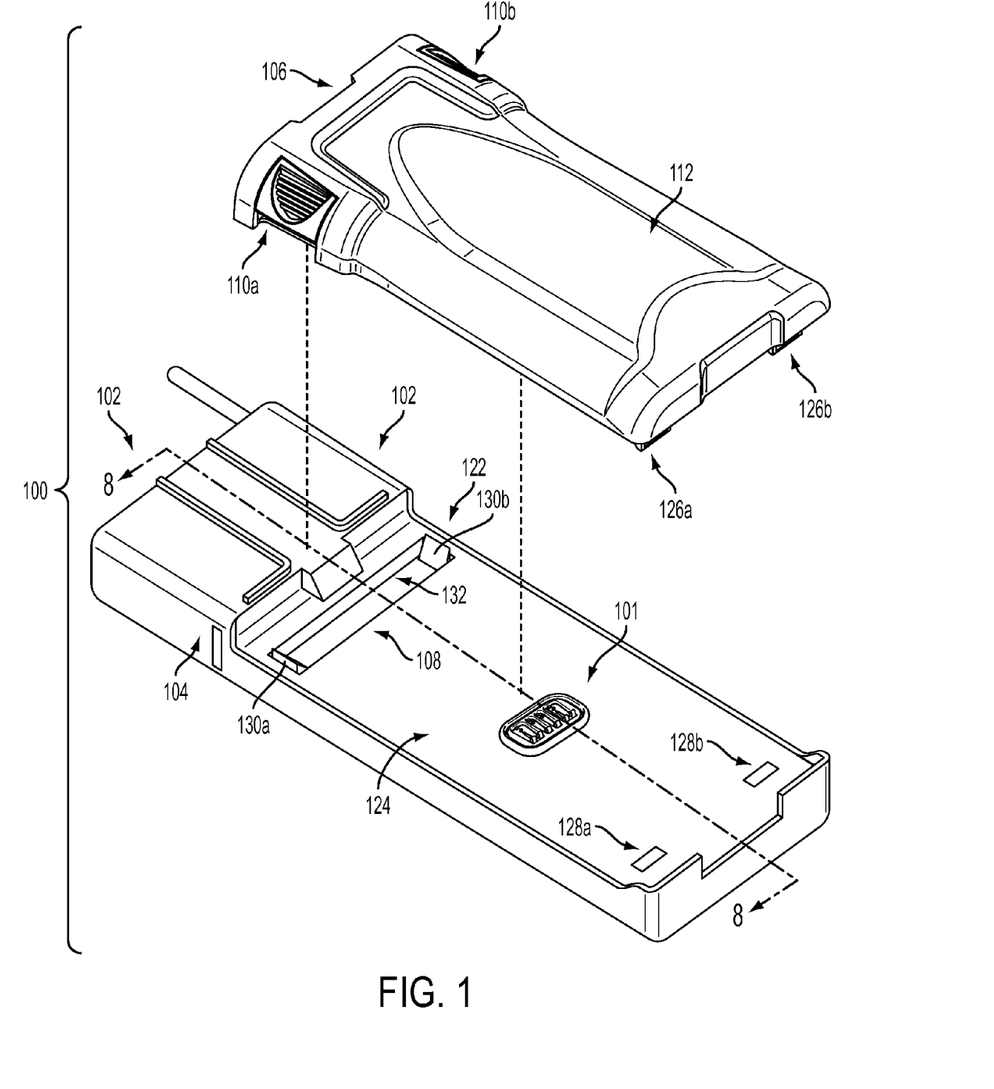
FIG. 1 is an exploded view of an exemplary electronic device including a removable battery assembly that is useful for understanding the present invention.
Figure 2:
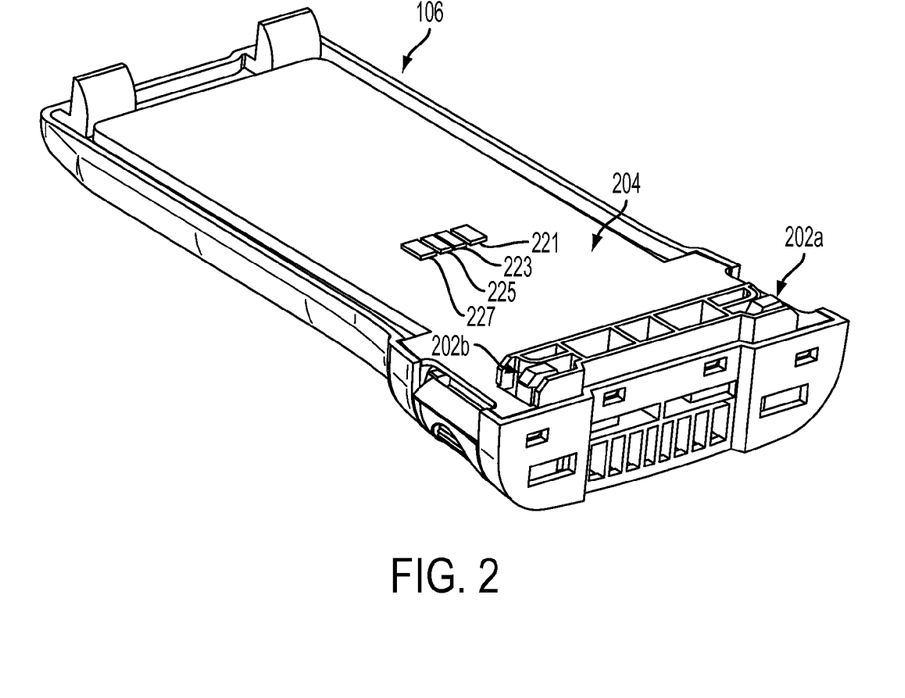
FIG. 2 is a bottom perspective view of the battery assembly of FIG. 1.

Referring now to FIGS. 1-2, there are provided schematic illustrations of an exemplary electronic device 100 that is useful for understanding the present invention. Although the electronic device 100 is shown to be a radio, the invention is not limited in this regard. For example, the electronic device 100 can be a radio, a mobile telephone, a cellular telephone, a video camera, a recording device, a camera, a sensor, a garage door opener, a smoke alarm, a television controller, or any other electronic device.

As shown in FIGS. 1-2, the electronic device 100 generally comprises a housing 102 configured to house circuits (e.g., PCB 801 shown in FIG. 8), and other electronic components (not shown). The electronic device 100 includes a removable electronic component. For purposes of describing the invention, it shall be assumed that the removable electronic component is a removable battery assembly. Still, it should be understood that the invention is not limited in this regard, and other types of removable electronic components are also possible. Removable battery assembly 106 is provided for supplying power to the electronic components (not shown) during operation of the electronic device 100. In this regard, the battery can include, but is not limited to, a single cell battery or a multiple cell battery. The term "cell", as used herein, includes any type of electrochemical cell including an electrolytic cell, a galvanic cell, a voltaic cell, a fuel cell and a flow cell.

Housing 102 can be formed from any conductive or non-conductive material. Such conductive materials include, but are not limited to, metal materials and composite materials. Such non-conductive materials include, but are not limited to, rubbers and plastics. In some embodiments, the housing material is selected to withstand high temperatures and/or harsh environmental conditions such that the internal components of the electronic device 100 are protected from damage from external factors.

Housing 102 is comprised of a main body 104. The battery assembly 106 can be coupled to the main body 104 via a latching mechanism 108. The battery assembly 106 is configured to allow: the attachment of at least one battery (not shown) within the battery assembly 106 to the electronic device 100; and the detachment of the battery (not shown) from the electronic device 100. Battery assembly 106 comprises a top cover 112 and bottom cover 204.

The battery attachment is accomplished by coupling the battery assembly 106 to a back wall 124 of a battery compartment 122 of the electronic device 100. The battery assembly 106 is coupled to the back wall 124 by inserting bottom latches 126a, 126b into cavities 128a, 128b formed in back wall 124, and then rotating the battery assembly 106 towards the electronic device 100. Thereafter, top latches 202a, 202b are latched to the back wall 124. The top latches 202a, 202b are latched by simultaneously pushing the buttons 110a, 110b and releasing the buttons such that the top latches 202a, 202b are snapped into engagement with latch surfaces 130a, 130b of the back wall 124.

The battery removal is accomplished by the de-coupling of the battery assembly 106 from the back wall 124 of the battery compartment 122. The battery assembly 106 is decoupled from the back wall 124 by releasing the top latches 202a, 202b of the latch mechanism 108. The top latches 202a, 202b are unlatched or released by simultaneously pushing and rotating the buttons 110a, 110b. The bottom latches 126a, 126b are unlatched by rotating the battery assembly 106 up and away from the back wall 124 subsequent to the release of the top latches.

As shown in FIGS. 1-2, the top latches 202a, 202b and bottom latches 126a, 126b protrude out and away from a bottom cover 204 of the battery assembly 106. As such, the back wall 124 of the battery compartment 122 comprises a cavity 132 sized and shaped for receiving the top latches 202a, 202b. In this regard, it should be understood that the cavity 132 has latch surfaces 130a, 130b configured for engaging the top latches 202a, 202b. In this regard, each latch surface 130a, 130b comprises a hook which facilitate snapping of a respective top latch 202a, 202b into engagement therewith.

As shown in FIG. 2, battery assembly 106 comprises a plurality of battery contacts 221, 223, 225, and 227 disposed on bottom cover 204. When battery assembly 106 is attached to electronic device 100, each of the battery contacts 221, 223, 225, and 227 is configured to mate with a corresponding contact of electrical connector 101, as described in detail below.

Figure 3:
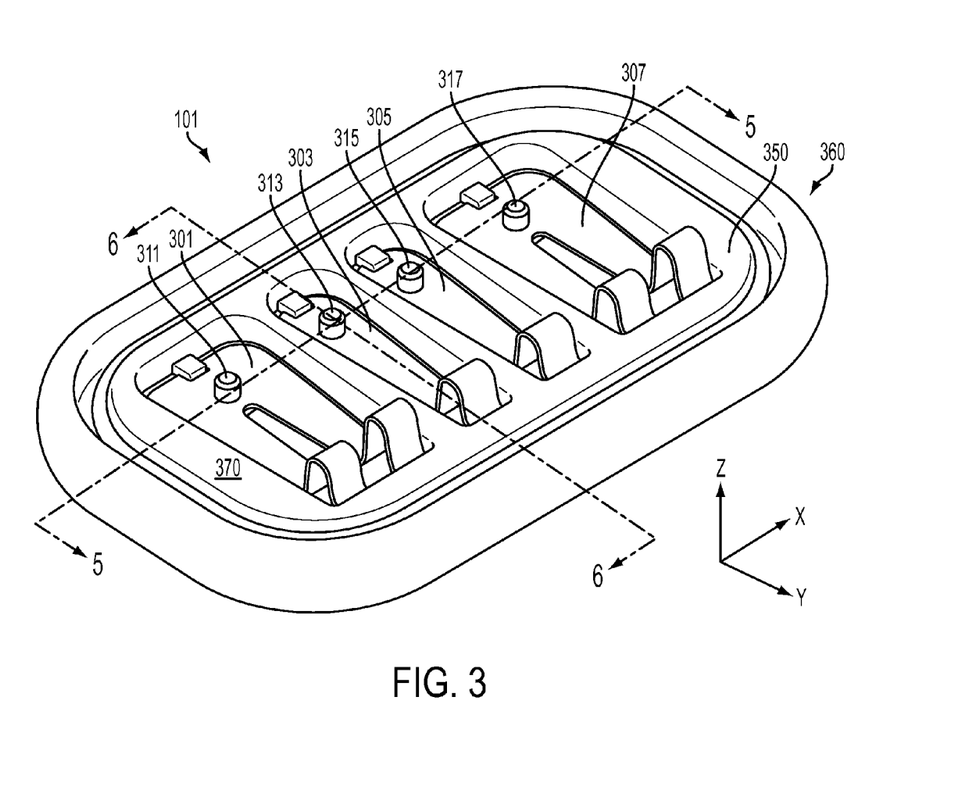
FIG. 3 is a top perspective view of an exemplary electrical connector that is useful for understanding the present invention.

Referring now to FIG. 3, there is provided a top perspective view of electrical connector 101 according to an exemplary embodiment. Electrical connector 101 comprises a connector body 350, outer seal 360, spring members 301, 303, 305, and 307, and conductive posts 401, 403, 405, and 407 (shown in FIGS. 4-5). The electrical connector 101 is configured to be mounted to a Printed Circuit Board (PCB) (e.g., 801) disposed within a housing (e.g., 102) of an electronic device (e.g., 100). Spring members 301, 303, 305, and 307 are accessible to the outside via an aperture (e.g., 803) defined in a wall (e.g., back wall 124) of a housing (e.g., 102). Thus, electrical connector 101 facilitates electrical connections between a removable component, such as battery assembly 106, and circuits disposed within a housing (e.g., 102) of an electronic device (e.g., 100), such as PCB 801.

Connector body 350 comprises a planar layer of insulator material with two opposing faces (e.g., 370, 470) and a peripheral wall 553 extending between the two faces. For example, connector body 350 can be a solid piece of plastic formed of a material having properties that enable bonds to be formed with the electrical contacts and the seal material that satisfy the requirements of the device. Connector body 350 can be formed using insert molding and/or injection molding techniques as described below. Connector body 350 can take the shape of a relatively thin rectangular wafer. Connector body 350 has a contoured top surface that comprises multiple levels, including an uppermost (in the "Z" direction) surface 370, and a plurality of elongated cavity structures wherein the plurality of spring members 301, 303, 305, and 307 are disposed. Each elongated cavity structure comprises a recess molded in surface 370. Connector body 350 further comprises a peripheral wall having a ridge 551 that extends around a periphery of connector body 350 and is configured to engage outer seal 360.

Outer seal 360 is secured to a peripheral wall (not shown) of connector body 350, and extends along the outer periphery of electrical connector 101. Outer seal 360 can be formed of a resilient sealing material and can have a generally "U"-shaped profile. The U-shaped profile includes a first portion 561 that extends away from a face of the peripheral wall in a first transverse direction, and includes a second portion 565 which is curved to extend in at least a second direction toward the peripheral wall. Outer seal 360 is configured so that, when sealingly engaged with an aperture (e.g., 803) defined in a housing (e.g., 102) of an electronic device (e.g., 100), it will resist intrusion into the electronic device (e.g., 100) by substances, including, but not limited to, fluids, liquids, gases, liquid water, water vapor, ice, wind-blown rain and freezing rain, humidity, sand, and dust. Outer seal 360 can be preformed around connector body 350 by any suitable means. For example, an over-molding process can be used for this purpose. In such embodiments, outer seal 360 can be an injection-molded silicone seal formed directly on a peripheral wall of connector body 350. Embodiments of the present invention are not limited in this regard. For example, the seal material can comprise any material that resists moisture and allows a level of protection that satisfies the requirements of the device.

Spring members 301, 303, 305, and 307 are configured to provide an electrical connection between conductive posts 401, 403, 405, and 407 and electrical contacts (e.g., battery contacts 221, 223, 225, and 227) on a removable component, such as battery assembly 106. Each spring member 301, 303, 305, and 307 comprises an elongated cantilevered beam secured to a corresponding spring anchor, as described in detail below. Spring members 301, 303, 305, and 307 are secured to conductive posts 401, 403, 405, and 407 by spring anchors 311, 313, 315, and 317, which facilitate an electrical and mechanical connection between each spring member and a corresponding conductive post. Spring anchors 311, 313, 315, and 317 can include welds, screws, rivets, and/or any other fastener known in the art that is suitable for securing a spring member to a conductive post. Spring members 301, 303, 305, and 307 can be die cut and installed after insert molding of connector body 350.

Figure 4:
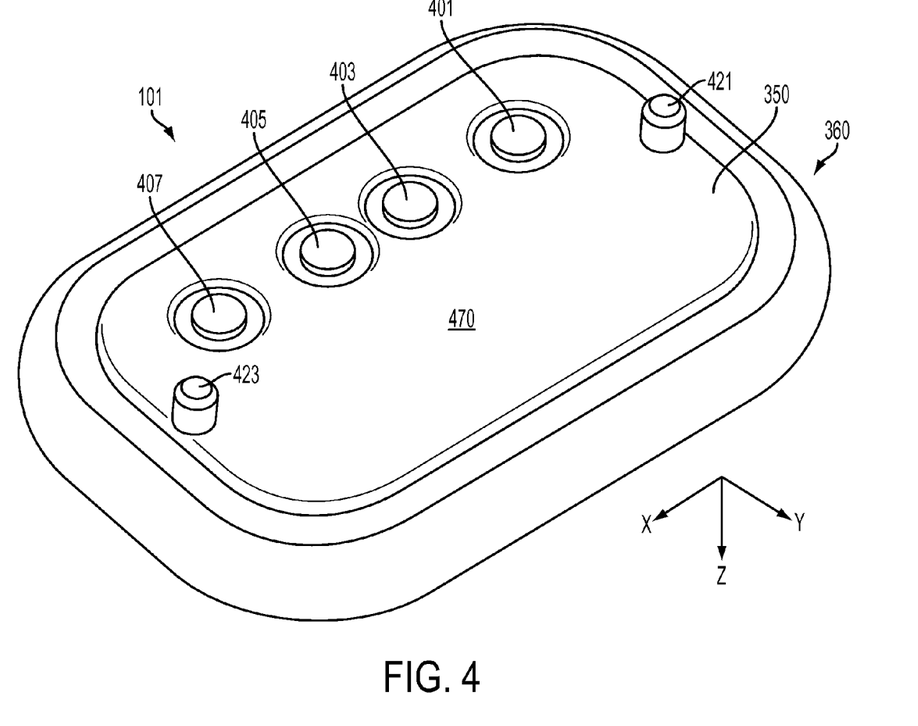
FIG. 4 is a bottom perspective view of the electrical connector of FIG. 3.

Referring now to FIG. 4, there is provided a bottom perspective view of electrical connector 101 according to an exemplary embodiment. Electrical connector 101 comprises a plurality of conductive posts 401, 403, 405, and 407, each of which is disposed in, and secured by, connector body 350. Each conductive post 401, 403, 405, and 407 traverses the planar layer of the connector body 350 between face 370 and 470. Conductive posts 401, 403, 405, and 407 can be insert molded together with connector body 350, such that they are held captive therein. Insert molding can involve loading conductive posts 401, 403, 405, and 407 in a mold and injecting molten plastic into the mold to form connector body 350 around the conductive posts. By insert molding the conductive posts 401, 403, 405, and 407 in connector body 350, an integral seal is formed around each of the conductive posts 401, 403, 405, and 407. A spring anchor 311, 313, 315, and 317 is disposed at the top surface of each conductive post 401, 403, 405, and 407. The bottom surface of each conductive post 401, 403, 405, and 407 is advantageously designed for use as an electrical contact element, such as a Surface Mount Technology (SMT) contact point. Each conductive post can perform multiple functions, including: (1) providing an SMT contact point (e.g., on a bottom surface of the post), (2) providing an electrical connection through the connector body to a corresponding spring member, and (3) providing a fulcrum for an attached spring member. While electrical connector 101 is shown with 4 conductive posts, it will be understood that more or fewer conductive posts can be provided.

Connector body 350 further comprises mounting posts 421 and 423, which are disposed on bottom surface 470 and configured to facilitate mounting and alignment of the electrical connector 101 on a PCB (e.g., 801). For example, mounting posts 421 and 423 can be inserted in appropriately sized and positioned mounting holes in a PCB. Electrical connector 101 can be mounted directly on a PCB using Surface Mount Technology (SMT) techniques, as described in detail below.

Figure 5:
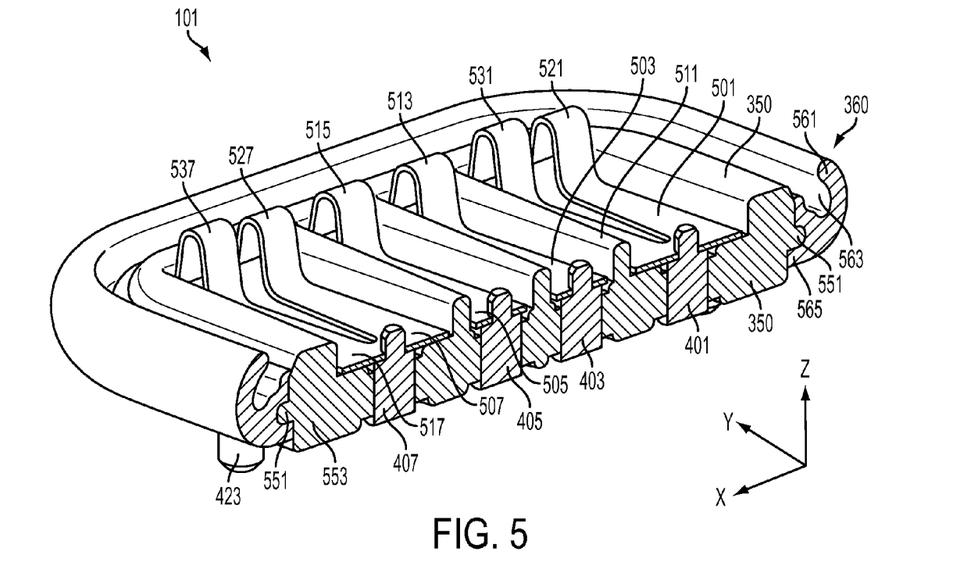
FIG. 5 is a cross-sectional view of the electrical connector of FIG. 3 taken along line 5-5.

Referring now to FIG. 5, there is provided a cross-sectional view of electrical connector 101 taken along line 5-5 of FIG. 3. Each spring member 301, 303, 305, and 307 comprises at least one prong 501, 511, 503, 505, 507, and 517. For example, spring member 301 comprises prongs 501 and 511, while spring member 303 comprises a single prong 503. Each prong 501, 511, 503, 505, 507, and 517 comprises a relatively thin strip of conductive material, such as copper. However, the invention is not limited in this regard, and the prongs can have a cylindrical or other geometric shape. Each prong 501, 511, 503, 505, 507, and 517 further comprises a contact portion 521, 531, 513, 515, 527, 537 configured to make an electrical connection with a corresponding contact (e.g., battery contacts 221, 223, 225, and 227) on a removable component, such as battery assembly 106.

Each prong 501, 511, 503, 505, 507, and 517 has an intrinsic elasticity and a corresponding spring constant. For example, when a downward force is applied to a prong, such as by an electrical contact (e.g., battery contacts 221, 223, 225, and 227) of a removable component (e.g., battery assembly 106), the prong will exert an opposite (upward) force, thereby pressing the contact portion 521, 531, 513, 515, 527, 537 of the prong against the electrical contact of the removable component to form an electrical connection. A prong having a higher elasticity will generally produce a larger force when flexed.

In some cases, shock and/or vibration can cause a contact portion of a prong to disengage from the corresponding electrical contact of a removable component, causing a loss of connection or intermittent connection. Also, some electrical contacts may be required to conduct relatively high levels of electric current. Accordingly, electrical connector 101 advantageously provides multiple prongs for certain electrical contacts. For example, spring member 301 comprises prongs 501 and 511, with prong 501 having a different elasticity (spring constant) than prong 511. By providing multiple prongs for a single spring member, the likelihood of connection loss is reduced. For example, the likelihood that two prongs with different elasticity will simultaneously disengage from a corresponding electrical contact on a removable component is relatively low. Moreover, providing multiple prongs can reduce resistive losses, e.g., for electric power connections. Notably, the invention is not limited to only two prongs per spring member, and can be extended to include three or more prongs for a single spring member. The number of prongs used for each spring member can depend on the importance of the corresponding connection. For example, a power contact can be considered more important than a data contact, and thus more prongs can be used for the power contact.

Contact portions 521, 531, 513, 515, 527, 537 are comprised of a bend or undulation in the corresponding prong 501, 511, 503, 505, 507, and 517. Each contact portion 521, 531, 513, 515, 527, 537 extends upward (in a "Z" direction) above a plane defined by surface 370 of connector body 350, and above outer seal 360, such that the contact portion can make contact with an electrical contact (e.g., battery contacts 221, 223, 225, and 227) of a removable component such as battery assembly 106. However, the invention is not limited in this regard. In alternative embodiments, the contact portions do not extend above outer seal 360 and/or connector body 350. In such embodiments, electrical contacts (e.g., battery contacts 221, 223, 225, and 227) on the removable component (e.g., battery assembly 106) extend downward (in the "Z" direction) to make contact with contact portions 521, 531, 513, 515, 527, 537 when the removable component is attached to electronic device 100.

Outer seal 360 is secured to a perimeter of connector body 350, and to ridge 551. As discussed above, outer seal 360 can be comprised of a flexible, compressible silicone material. Outer seal 360 can be formed by over-molding, such as by injection molding of liquid silicone rubber prior to installation of the connector body on a circuit board. By over-molding outer seal 360 on connector body 350, a water-tight seal is formed therebetween. Still, the invention is not limited in this regard and other means can also be used to pre-install the outer seal. For example, an adhesive can be used for this purpose. Ridge 551 facilitates securing outer seal 360 to connector body 350, such as by providing additional surface area for a bond, and resistance to slippage (e.g., vertical movement) of outer seal 360 relative to connector body 350.

Figure 6A:
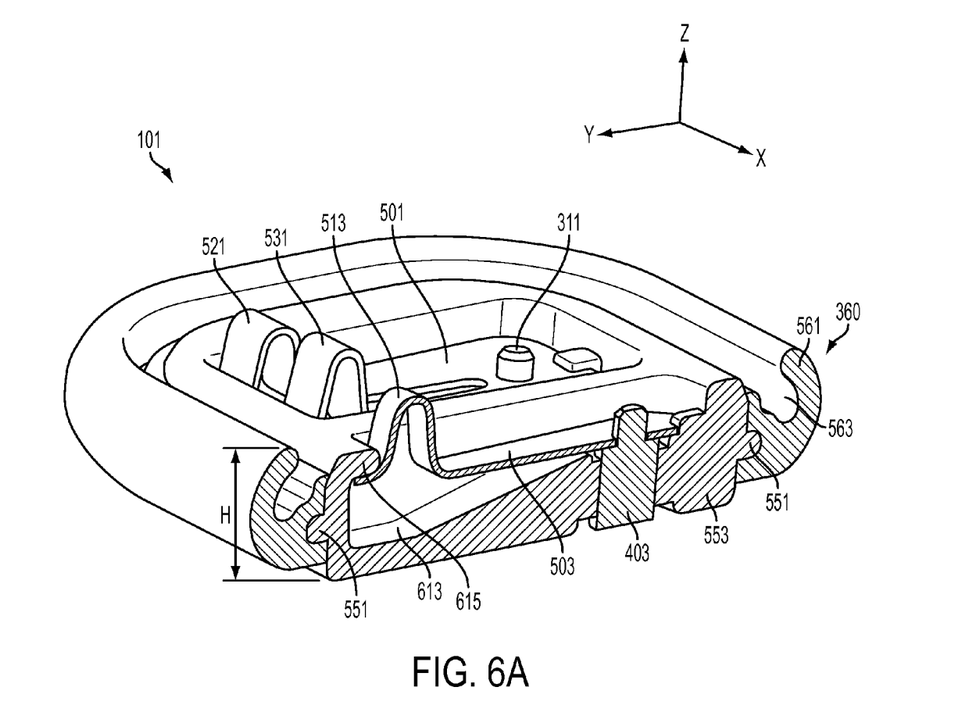
FIG. 6A is a cross-sectional view of the electrical connector of FIG. 3 taken along line 6-6.
Figure 8:
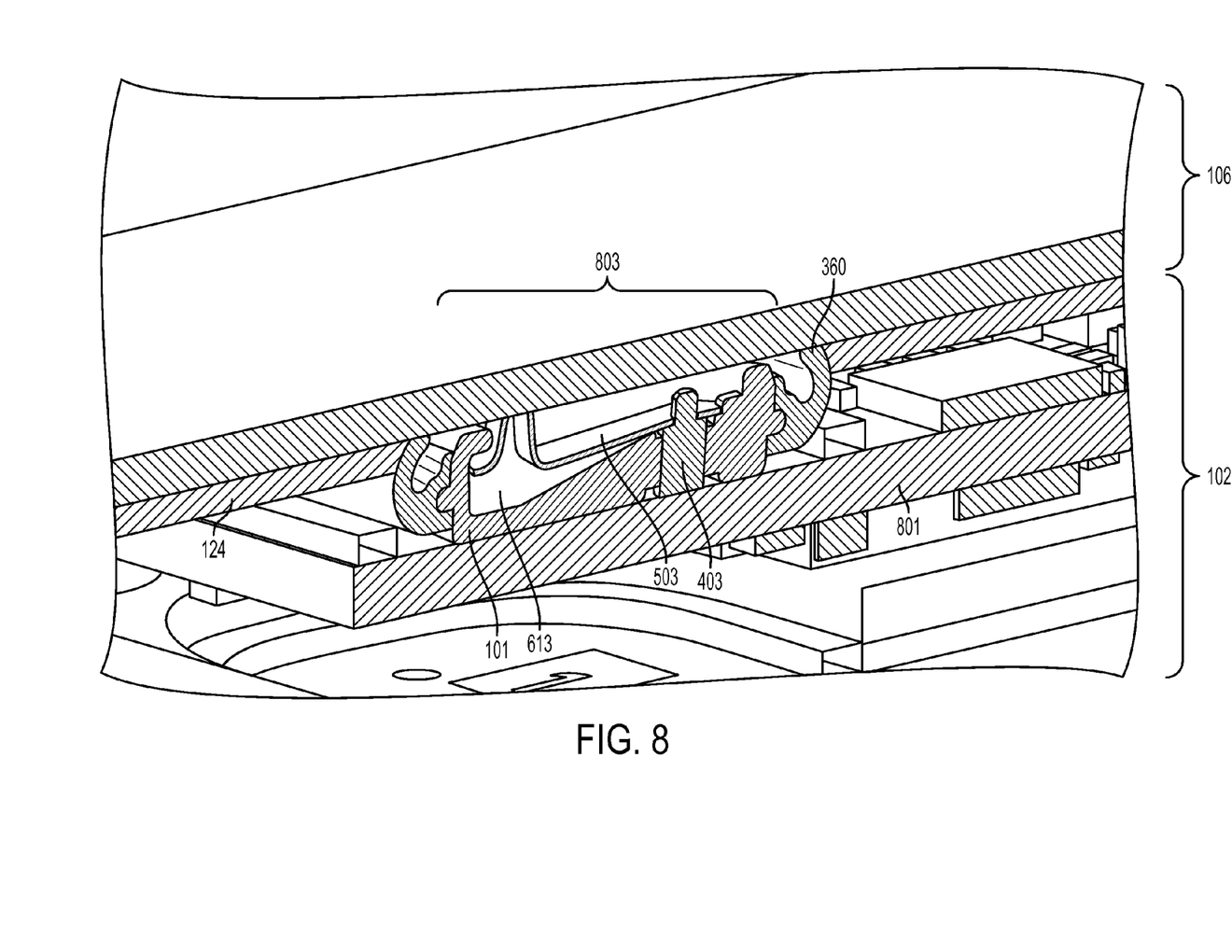
FIG. 8 is cross-sectional view of the exemplary electronic device of FIG. 1 taken along line 8-8.

Referring now to FIG. 6A, there is provided a cross-sectional view of electrical connector 101 taken along line 6-6 of FIG. 3. As can be seen in FIG. 6A, a recessed cavity 613 is formed in connector body 350. Prong 503 is disposed above cavity 613 (in the "Z" direction) when no force is applied to contact portion 513, i.e., when a removable component is not attached to electronic device 100. When a removable component (e.g., battery assembly 106) is attached, an electrical contact (e.g., battery contact 223) will press down on contact portion 513, causing prong 503 to resiliently flex downward into cavity 613, as shown in FIG. 8. Each prong 501, 511, 503, 505, 507, and 517 is disposed above a cavity in connector body 350 similar to cavity 613. When a removable component is detached, prong 503 will rest against spring tab 615 which limits the vertical displacement of prong 503.

Outer seal 360 can be configured to provide a seal around an aperture (e.g., 803) even when a top surface of electrical connector 101 is exposed to a pressured flow of fluid. When a fluid, such as liquid water, is present in channel 563, the fluid pressure will exert an outward force on upper portion 561, pressing upper portion 561 against a housing (e.g., housing 102), and thereby forming a tighter seal between outer seal 360 and the housing.

Figure 6B:
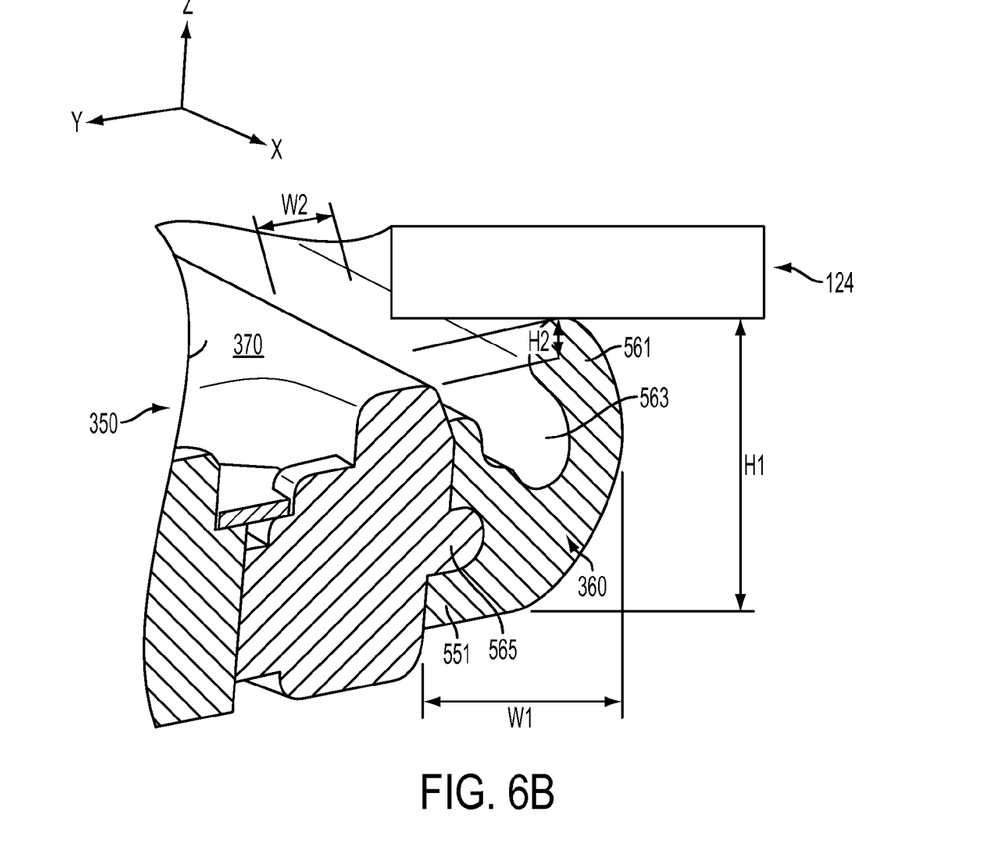
FIG. 6B is an enlarged view of a portion of the electrical connector of FIG. 6A installed in an exemplary electronic device.

Referring now to FIG. 6B, a close-up view of an edge of electrical connector 101 is provided in conjunction with back wall 124 of an exemplary housing (e.g., 102). Outer seal 360 comprises an upper portion 561 that extends upward (in the "Z" direction) above the top surface of connector body 350, and channel 563 which generally comprises a "U"-shaped cross-sectional profile. As discussed above, electrical connector 101 is designed to be installed on a Printed Circuit Board (PCB) subjacent (in the "Z" direction) to a housing wall (e.g., back wall 124 of housing 102) of an electronic device (e.g., 100). A downward force exerted on upper portion 561 will cause it to resiliently flex downward and inward, toward connector body 350. Due to its inherent elasticity, outer seal 360 and will exert an opposite, outward force on the housing wall, thereby providing a water-tight seal. The material used for outer seal 360 can be selected based on a desired elasticity for a particular application.

Electrical connector 101 is advantageously configured to provide a seal with relatively large tolerances in its placement relative to an aperture (e.g., 803) of a housing wall. More particularly, outer seal 360 has a cross-sectional profile that allows the seal to partially collapse in the vertical ("Z"), horizontal ("X"), and lateral ("Y") directions to accommodate variations in spacing and placement. In this regard, outer seal 360 has an overall height H1, and overall width W1. Upper portion 561 extends a vertical distance H2 (in the "Z" direction) above uppermost surface 370 of connector body 350, thereby providing a vertical tolerance. The vertical tolerance allows for variation in the vertical distance between electrical connector 101 and housing wall 124. Outer seal 360 also provides a tolerance in the horizontal ("X") direction and lateral ("Y") direction because it extends a distance W1 from connector body 350. The horizontal and lateral tolerance allows for variation in the horizontal and/or lateral distance between electrical connector 101 and an aperture (e.g., 803) in housing wall 124. Thus, the vertical, horizontal, and lateral tolerances allow for errors in the alignment of electrical connector 101 with a housing wall and/or aperture in a housing wall. The tolerances also allow for a single embodiment of electrical connector 101 to be used with a wide variety of electronic devices having differently sized apertures (e.g., 803) and different vertical distances between a PCB (e.g., 801), and a housing wall (e.g., 124).

It should be noted that the invention is not limited to particular dimensions. Still, it is preferred that the vertical height H1 is approximately commensurate with other surface mount components disposed on the same circuit board. Electrical connector 101 can be scaled to suit different applications and differently sized electronic devices. In one embodiment, the overall height H (in the "Z" direction) of electrical connector 101 is approximately 3 mm. However, it should be noted that height H can vary depending on the desired application. An exemplary range for height H is between 2 mm and 6 mm. An exemplary range for outer seal width W1 is between 1 mm and 6 mm. An exemplary range for outer seal height H1 is between 2 mm and 6 mm. An exemplary range for height H2 is between 1 mm and 4 mm.

Figure 7:
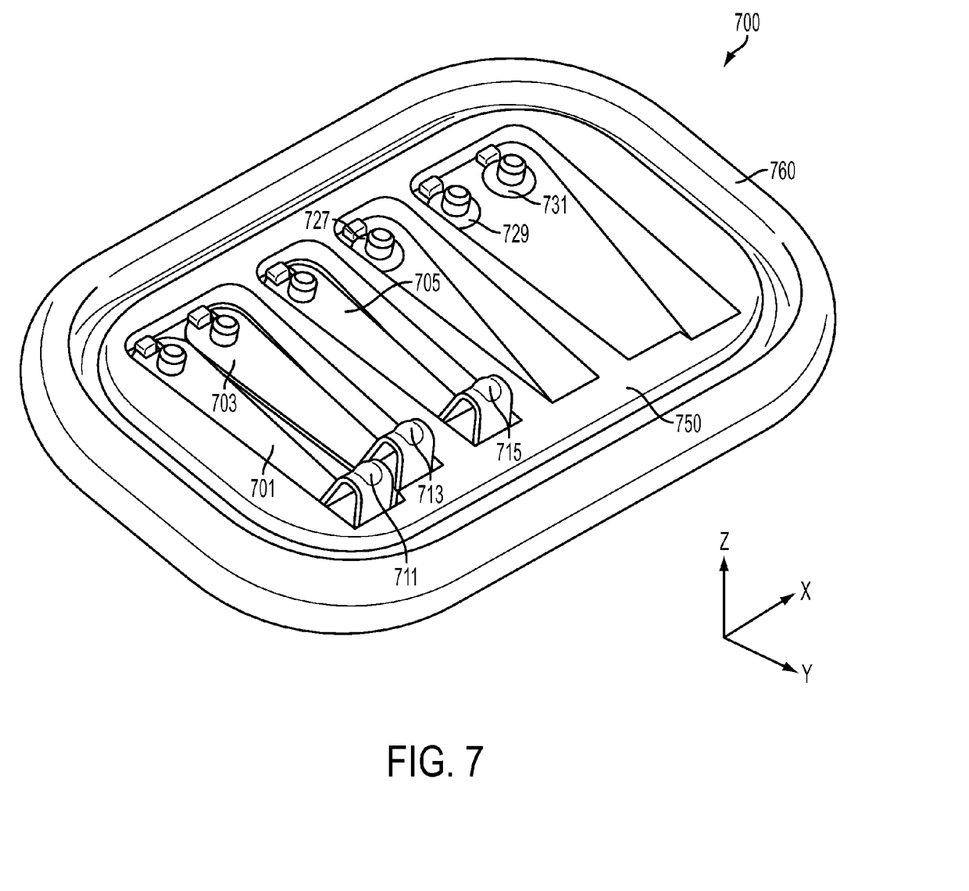
FIG. 7 is a top perspective view of an exemplary electrical connector that is useful for understanding the present invention.

Referring now to FIG. 7, there is provided a top perspective view of an electrical connector 700 according to an alternative exemplary embodiment. Electrical connector 700 comprises a connector body 750, outer seal 760, and 6 spring members, of which only spring members 701, 703, and 705 are shown in FIG. 7. The other three spring members are not shown in FIG. 7 to reveal conductive posts 727, 729, and 731. Spring members 701, 703, and 705 comprise contact portions 711, 713, and 715, which include a bend in the spring member and a raised conductive nub at the apex of the bend. Each conductive nub can be welded or pressed into the corresponding contact portion 711, 713, and 715. Notably, electrical connector 700 comprises two individual conductive posts 729 and 731 for connection to a single contact of a removable component. Conductive posts 729 and 731 can be electrically connected by a PCB on which electrical connector 700 is mounted.

Referring now to FIG. 8, there is provided a cross-sectional view of an exemplary electronic device comprising a housing 102, back wall 124 of housing 102, removable battery assembly 106, and PCB 801 having a electrical connector 101 mounted on a top surface thereof. PCB 801 comprises a plurality of SMT contacts on the top surface. As described above, the electrical connector 101 provides electrical connections between battery contacts 221, 223, 225, and 227 and PCB 801. Aperture 803 is formed in back wall 124. A periphery of aperture 124 is aligned with outer seal 360. Outer seal 360 is compressed by wall 124 of housing 102, thereby forming a water-tight seal between electrical connector 101 and back wall 124.

Figure 9:
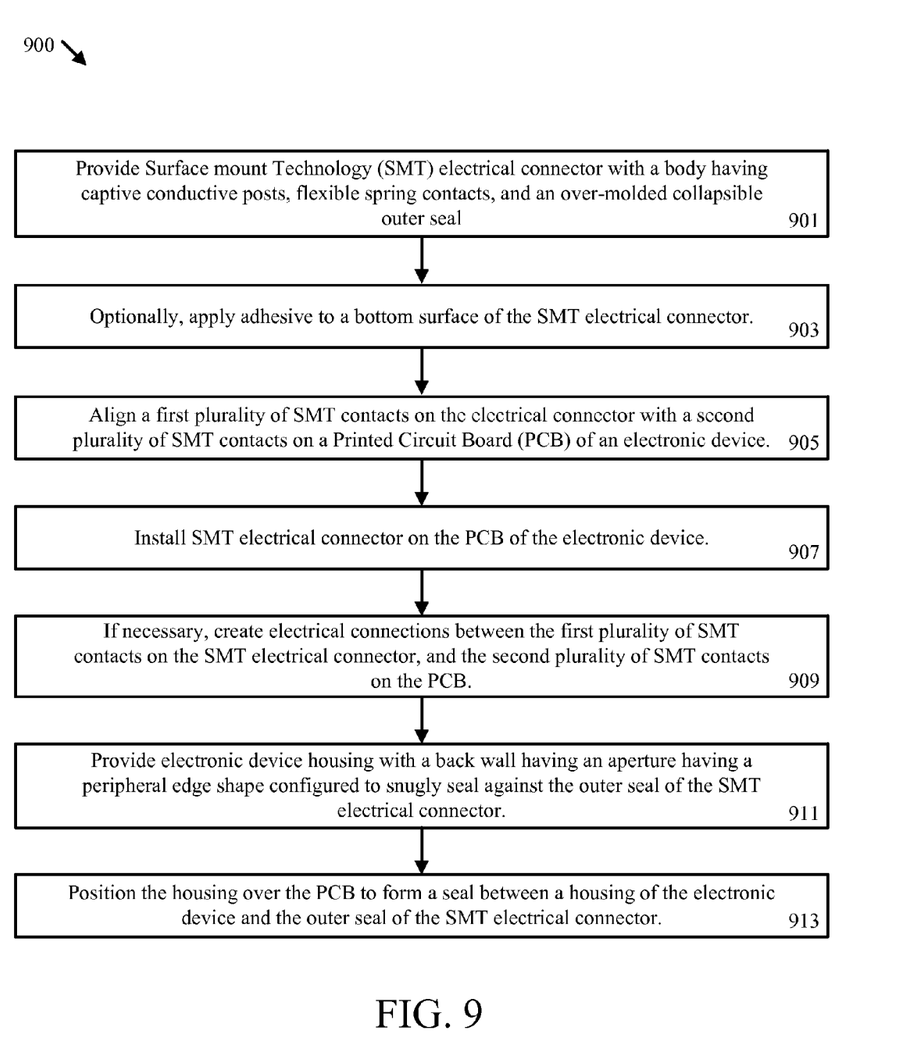
FIG. 9 is a flow diagram of an exemplary method for installing a electrical connector in an electronic device.

Referring now to FIG. 9, there is provided a flow diagram of an exemplary method for packaging an electrical connector in an electronic device. The method begins at step 901 wherein a Surface Mount Technology (SMT) electrical connector is provided. The electrical connector can be the same or similar to electrical connector 101 or 700. The electrical connector comprises a connector body having a plurality of captive conductive posts, a plurality of flexible spring members, and an over-molded collapsible outer seal.

At optional step 903, adhesive is applied to a bottom surface (e.g., 470) of the electrical connector (e.g., 101, 700). However, step 903 is optional, and in some embodiments the electrical connector is secured to the PCB exclusively by a solder compound applied later, such as in step 909. For example, a conductive adhesive can be applied to the bottom surfaces of the conductive posts (e.g., 401, 403, 405, 407).

At step 905, a first plurality of SMT contacts (e.g., bottom surfaces of conductive posts 401, 403, 405, 407) is aligned with a second plurality of SMT contacts on a Printed Circuit Board (PCB), such as PCB 801.

At step 907, the electrical connector is installed on a PCB (e.g., 801). The PCB can be disposed in an electronic device, such as electronic device 100. The electrical connector can be installed using Surface Mount Technology delivery systems, including, but not limited to, tape and reel, and robotic pick and place.

At step 909, electrical connections are created between the electrical connector and electrical contacts on the PCB (e.g., 801). The electrical connections can be created using reflow soldering techniques, for example. If a conductive adhesive was applied in step 903, then the electrical connections can be formed upon installation. In other words, step 909 can optionally overlap with step 907.

At step 911, a housing (e.g., 102) of an electronic device (e.g., 100) is provided. The housing comprises a back wall (e.g., 124) having an aperture (e.g., 803) defined therein. The aperture has a peripheral edge shape configured to snugly seal against the outer seal of the SMT electrical connector. The aperture size and shape is preferably within the sealing tolerances of the electrical connector, as discussed above.

At step 913, a seal is formed between the housing and the electrical connector. The housing is positioned over the PCB such that the aperture is aligned with the electrical connector. The housing compresses and/or collapses the outer seal (e.g., 360), thereby forming a water-tight seal between the housing and the electrical connector. The housing can be secured to the electronic device at step 913.

Various aspects of the electrical connector 101 can be modified by a practitioner depending on the desired environment and/or application. For example, the number of spring members, conductive posts, spring anchors, prongs, and contact portions is variable according to the application. Furthermore, it will be understood that the size and shape of the electrical connector can be varied to accommodate various electronic devices and PCB combinations. For example, while the embodiments of the electrical connector shown in the figures are generally oval shaped, the electrical connector can be round or some other geometric shape.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. An electrical connector, comprising:
   a connector body including a planar layer of insulator material having a first face opposed from a second face, and a peripheral wall extending around a periphery of said connector body from said first face to said second face;
   at least one conductive post traversing said planar layer from said first face to said second face, and including
   (1) an electrical contact element at a first end of said conductive post disposed at said first face and
   (2) a fulcrum element providing a point of rest on which an attached spring member turns when used to make an electrical connection with a corresponding contact on an electronic device said fulcrum element located at an opposing end of said conductive post disposed at said second face;
   at least one elongated cavity structure comprising a recess integral with said second face;
   at least one conductive spring member pivotable on said fulcrum element, and comprising an elongated cantilevered beam element secured at an end thereof to said conductive post by a spring anchor within said elongated cavity structure; and
   an outer seal coextensive with said peripheral wall.

2. The electrical connector according to claim 1, wherein said outer seal formed of a resilient sealing material which is different from said insulator material.

3. The electrical connector according to claim 2, wherein said resilient sealing material is formed directly on said peripheral wall.

4. The electrical connector according to claim said outer seal has a U-shaped profile.

5. The electrical connector according to claim 4, wherein said U-shaped profile includes a first portion that extends away from a face of said peripheral wall in a first transverse direction, and includes a second portion which is curved to extend in at least a second direction toward said peripheral wall.

6. The electrical connector according to claim 2, wherein said peripheral wall includes at least one ridge member which extends along said peripheral wall around a periphery of said connector body and is configured to engage said outer seal.

7. The electrical connector according to claim 1, wherein said connector body forms an integral seal around said conductive post.

8. The electrical connector according to claim 1, wherein a spring tab is provided on said second face opposed from said spring anchor and limits a displacement of said elongated cantilevered beam element in a direction away from said second face.

9. The electrical connector according to claim 1, wherein said elongated cantilevered beam element includes a contact portion at an end thereof opposed to said spring anchor, said contact portion comprising an undulation in said elongated cantilevered beam element.

10. The electrical connector according to claim 9, wherein said contact portion extends above a plane defined by said second face.

11. A sealed electronic device, comprising:
    a printed wiring board;
    an electrical connector secured to said printed wiring board, said electrical connector comprising
    a connector body includes a planar layer of insulator material having a first face opposed from a second face, and a peripheral wall extending around a periphery of said connector body from said first face to said second face,
    at least conductive post traversing said planar layer from said first face to said second face, and including
    (1) an electrical contact element at a first end of said conductive post disposed at said first face, and
    (2) a fulcrum element providing a point of rest on which an attached spring member turns when Used to make an electrical connection with a corresponding contact on an electronic device, such fulcrum element located at an opposing end of said conductive post disposed at said second face,
    at least one elongated cavity structure comprising a recess integral with said second face,
    at least one conductive spring member pivotable on said fulcrum element, and comprising an elongated cantilevered beam element secured at an end thereof to said conductive post by a spring anchor within said cavity structure, and
    an outer seal coextensive with said peripheral wall.

12. The sealed electronic device according to claim 11, further comprising a housing which encloses said printed wiring board, said housing including at least one housing wall having an aperture therein.

13. The sealed electronic device according to claim 12, wherein a periphery of said aperture is aligned with said outer seal of said electrical connector.

14. The sealed electrical device according to claim 13, wherein said outer seal is compressed against said housing wall to form a seal which prevents the entry of fluid into an interior of said housing.

15. The sealed electrical device according to claim 11, wherein said outer seal is formed of a resilient sealing material which is different from said insulator material.

16. The sealed electrical device according to claim 15, wherein said resilient sealing material is formed directly on said peripheral wall.

17. The sealed electrical device according to claim 15, wherein said outer seal has a U-shaped profile.

18. The sealed electrical device according to claim 17, wherein said U-shaped profile includes a first portion that extends away from a face of said peripheral wall in a first transverse direction, and includes a second portion which is curved to extend in at least a second direction toward said peripheral wall.

19. The sealed electrical device according to claim 11, wherein said connector body forms an integral seal around said conductive post.

20. The sealed electrical device according to claim 11, wherein a spring tab is provided on said second face opposed from said spring anchor and limits a displacement of said elongated cantilevered beam element in a direction away from said second face.

21. The sealed electrical device according to claim 11, wherein said elongated cantilevered beam element includes a contact portion at an end thereof opposed to said spring anchor, said contact portion comprising an undulation in said elongated cantilevered beam element.

22. The sealed electrical device according to claim 21, wherein said contact portion extends above a plane defined by said second face.

23. An electrical connector, comprising:
a connector body including a planar layer of insulator material having a first face opposed from a second face, and a peripheral wall extending around a periphery of said connector body from said first face to said second face
at least one conductive post traversing said planar layer from said first face to said second face, and including
  (1) an electrical contact element at a first end of said conductive post disposed at said first face, and
  (2) a fulcrum element providing a point of rest on which an attached spring member turns when used to make an electrical connection with a corresponding contact on and electronic device said fulcrum element located at an opposing end of said conductive post disposed at said second face;
at least one elongated cavity structure comprising a recess integral with said second face;
at least one conductive spring member pivotable on said fulcrum element, and comprising an elongated cantilevered beam element secured at an end thereof to said conductive post by a spring anchor member within said elongated cavity structure; and
an outer seal coextensive with said peripheral wall.

24. A method for providing a sealed connector on an electronic device, comprising:
disposing an electrical connector on a printed wiring board (PWB) to form at least one electrical connection with one of a plurality of surface mount technology (SMT) electrical contacts provided on first ends of conductive posts of the electrical connector, each said conductive post including a fulcrum providing a point of rest on which an attached spring member turns when used to make an electrical connection with a corresponding contact on an electronic device, said fulcrum element located at a second end opposed from said first end;
enclosing said printed wiring board within a housing including an aperture formed from at least one housing wall;
aligning an outer seal of said electrical connector with said aperture and compressing said outer seal against said housing wall.

25. The method according to claim 24, further comprising overmolding said outer seal on a connector body of said electrical connector.

26. The electrical connector of claim 1, wherein said conductive spring member comprises at least two prongs having different elasticity.

* * * * *